United States Patent
Choi et al.

(10) Patent No.: US 10,886,978 B2
(45) Date of Patent: Jan. 5, 2021

(54) METHOD AND APPARATUS FOR MULTI-ANTENNA TRANSMISSION TO MINIMIZE CHARGING TIME OF USERS IN WIRELESS POWERED COMMUNICATION NETWORK

(71) Applicant: Korea Advanced Institute of Science and Technology, Daejeon (KR)

(72) Inventors: Wan Choi, Daejeon (KR); Jinho Kang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/699,856

(22) Filed: Dec. 2, 2019

(65) Prior Publication Data

US 2020/0204218 A1    Jun. 25, 2020

(30) Foreign Application Priority Data

Dec. 19, 2018   (KR) .......................... 10 2018 0165192

(51) Int. Cl.
| | |
|---|---|
| H04B 7/04 | (2017.01) |
| H04B 7/0426 | (2017.01) |
| H04B 7/08 | (2006.01) |
| H02J 7/00 | (2006.01) |
| H01M 10/44 | (2006.01) |
| H04B 17/327 | (2015.01) |
| H04B 7/06 | (2006.01) |

(52) U.S. Cl.
CPC ............ *H04B 7/043* (2013.01); *H01M 10/44* (2013.01); *H02J 7/0068* (2013.01); *H04B 7/0634* (2013.01); *H04B 7/0857* (2013.01); *H04B 17/327* (2015.01)

(58) Field of Classification Search
CPC .... H04B 7/043; H04B 17/327; H04B 7/0857; H04B 7/0634; H02J 7/0068; H01M 10/44
See application file for complete search history.

(56) References Cited

U.S. PATENT DOCUMENTS

| | | | | |
|---|---|---|---|---|
| 10,158,173 | B2* | 12/2018 | Foo ..................... | H01Q 21/065 |
| 2008/0310486 | A1* | 12/2008 | Zhu ..................... | H04B 7/0854 |
| | | | | 375/149 |
| 2012/0071102 | A1* | 3/2012 | Palomar .............. | H04W 16/14 |
| | | | | 455/63.1 |
| 2012/0100877 | A1* | 4/2012 | Zangi ................... | H04B 7/024 |
| | | | | 455/501 |
| 2019/0326959 | A1* | 10/2019 | Davydov ............. | H04L 5/0051 |

* cited by examiner

*Primary Examiner* — Dac V Ha
(74) *Attorney, Agent, or Firm* — McCormick, Paulding & Huber PLLC (57) ABSTRACT

Provided is a method and apparatus for multi-antenna transmission to minimize a charging time of users in a wireless powered communication network. A power transmission apparatus may be configured to generate a covariance matrix to minimize a charging time of the power reception apparatus based on an amount of energy required by at least one power reception apparatus; to derive a beamforming vector using the covariance matrix; and to transmit a wireless power to the power reception apparatus based on the beamforming vector.

11 Claims, 6 Drawing Sheets

Algorithm

1: Input: Number of users K, MIMO Channels $\{H_k\}_{k=1}^{K}$, and required energies $\{E_k\}_{k=1}^{K}$ 2: Compute $G_k = (H_k) H_k^*$ 3: Solve following problem $$\begin{aligned} &\underset{S \in \mathbb{C}^{N \times N}, \tau}{\text{minimize}} \quad \tau \\ &\text{subject to} \quad \begin{bmatrix} \text{Tr}(G_k S) & \sqrt{E_k} \\ \sqrt{E_k} & \tau \end{bmatrix} \succeq 0, k \in \{1, ..., K\} \\ &\qquad \text{Tr}(S) \leq P \\ &\qquad S \succeq 0. \end{aligned}$$

4: Decompose S by eigenvalue decomposition, such that $S = v_1 v_1^* + v_2 v_2^* + \cdots + v_R v_R^*$ 5: Trasmit $x = \sum_{r=1}^{R} v_r d_r$ at energy transmitter to form R energy beams.

METHOD AND APPARATUS FOR MULTI-ANTENNA TRANSMISSION TO MINIMIZE CHARGING TIME OF USERS IN WIRELESS POWERED COMMUNICATION NETWORK

CROSS-REFERENCE TO RELATED APPLICATION

This application claims the priority benefit of Korean Patent Application No. 10-2018-0165192, filed on Dec. 19, 2018, in the Korean Intellectual Property Office, the disclosure of which is incorporated herein by reference.

BACKGROUND

1. Field of the Invention

The following description of example embodiments relates to a method and apparatus for multi-antenna transmission to minimize a charging time of users in a wireless powered communication network.

2. Description of the Related Art

With the current growing interest in Internet of things (IoT) communication and a sensor network, a number of electronic devices, for example, a smartphone and the like, significantly increases in a network and a battery charging has also become an issue accordingly. A wired charging method may easily charge a relatively small number of electronic devices, however, may be inconvenient to charge a large number of electronic devices in IoT communication and a sensor network since a single wired charger is required for each electronic device. Accordingly, high operation cost is required to periodically replace a battery of each electronic device or charge each electronic device with a wired charger.

To outperform the above limitations, wireless powered communication networks are currently gaining a great attention. There is an increasing interest in research capable of wirelessly charging a smartphone, a wearable ecteronic device, and a wireless sensor of a network through power supply thereto from a wireless base station. Dissimilar to the wired charging method, a wireless charging method may reduce inconvenience and operation cost in a network in which a charging demand is suddenly increasing.

The wireless charging method may charge an electronic device although the electronic device is separate away from a charger and may also simultaneously charge a plurality of electronic devices. Currently, research on wireless charging products is actively conducted in domestic and foreign academia and industry and related products are actually being launched in the actual industry. However, the current wireless charging method has a relatively low charging efficiency compared to the wired charging method. As wireless charging technology, research on wireless power transmission based on a radio frequency (RF) signal and a magnetic signal is actively ongoing. Here, the wireless power transmission based on the magnetic signal may be easy over a very short distance, however, may have a charging efficiency that rapidly varies based on positions of an electronic device and a charger. Accordingly, an interest in the RF signal-based wireless power transmission for short-range charging is growing.

However, the RF signal-based wireless power transmission has a limitation in that an amount of energy charged in an electronic device is small due to loss of a propagation path over a distance and a degradation in efficiency during a rectification process. To outperform the limitation and to apply wireless charging technology in a practically available network situation, research for increasing an amount of charging energy in an electronic device is essential.

To enhance the charging efficiency of users in RF signal-based wireless power transmission, research on an energy beamforming method that is a multi-transmission antenna transmission method is conducted as a signal processing method of a power transmitter. The energy beamforming method is similar to a beamforming method for improving a transmission rate of information transmission in a wireless communication system.

However, while a wireless communication system aims to control inter-user interference using a beamforming method to improve a transmission rate, a wireless powered communication network aims to achieve energy charging instead of improving the transmission rate. Dissimilar to information transmission, the energy charging does not consider the inter-user interference and thus, there is a need to design a method different from the beamforming method used for the information transmission. Compared to an information receiver, an energy charging receiver has a relatively high hardware sensitivity and thus, it may be difficult to directly apply the beamforming method used for the information transmission. Considering circuit features of the receivers, it is known that the energy charging receiver has a hardware sensitivity of −10 dBm and the information receiver has a hardware sensitivity of 60 dBM. Compared to the information receiver, the energy charging receiver requires a further high reception power. Accordingly, a precise energy beamforming method capable of improving an amount of charging energy is required.

SUMMARY

According to an aspect of example embodiments, there is provided a multi-antenna transmission method of a wireless power transmission in a wireless powered communication, the method including generating a covariance matrix to minimize a charging time of the power reception apparatus based on an amount of energy required by at least one power reception apparatus; deriving a beamforming vector using the covariance matrix; and transmitting a wireless power to the power reception apparatus based on the beamforming vector.

According to an aspect of example embodiments, there is provided a power transmission apparatus in a wireless powered communication network, the power transmission apparatus including a plurality of transmission antennas; and a processor configured to connect to the plurality of transmission antennas, and to transmit a wireless power to at least one power reception apparatus via the plurality of transmission antennas. The processor is configured to generate a covariance matrix to minimize a charging time of the power reception apparatus based on an amount of energy required by the power reception apparatus, to derive the beamforming vector using the covariance matrix, and to transmit the wireless power to the power reception apparatus based on the beamforming vector.

According to some example embodiments, it is possible to minimize a charging time of a power reception apparatus when a power transmission apparatus transmits a wireless power corresponding to an amount of energy required by the power reception apparatus. That is, the power transmission apparatus may perform energy beamforming for transmitting the wireless power to minimize a charging time of the power reception apparatus based on the amount of energy required by the power reception apparatus.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

Hereinafter, example embodiments will be described with reference to the accompanying drawings.

The example embodiments and the terms used herein are not construed to limit the disclosure to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B", "at least one of A and/or B", "A, B, or C", "at least one of A, B, and/or C", and the like may include any possible combinations of listed items. Terms "first", "second", "third", etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic", "logic block", "part", "circuit", etc. The module may be an integrally configured part, a minimum unit that performs at least function, or a portion thereof. For example, the module may be configured as an application-specific integrated circuit (ASIC).

Figure 1:
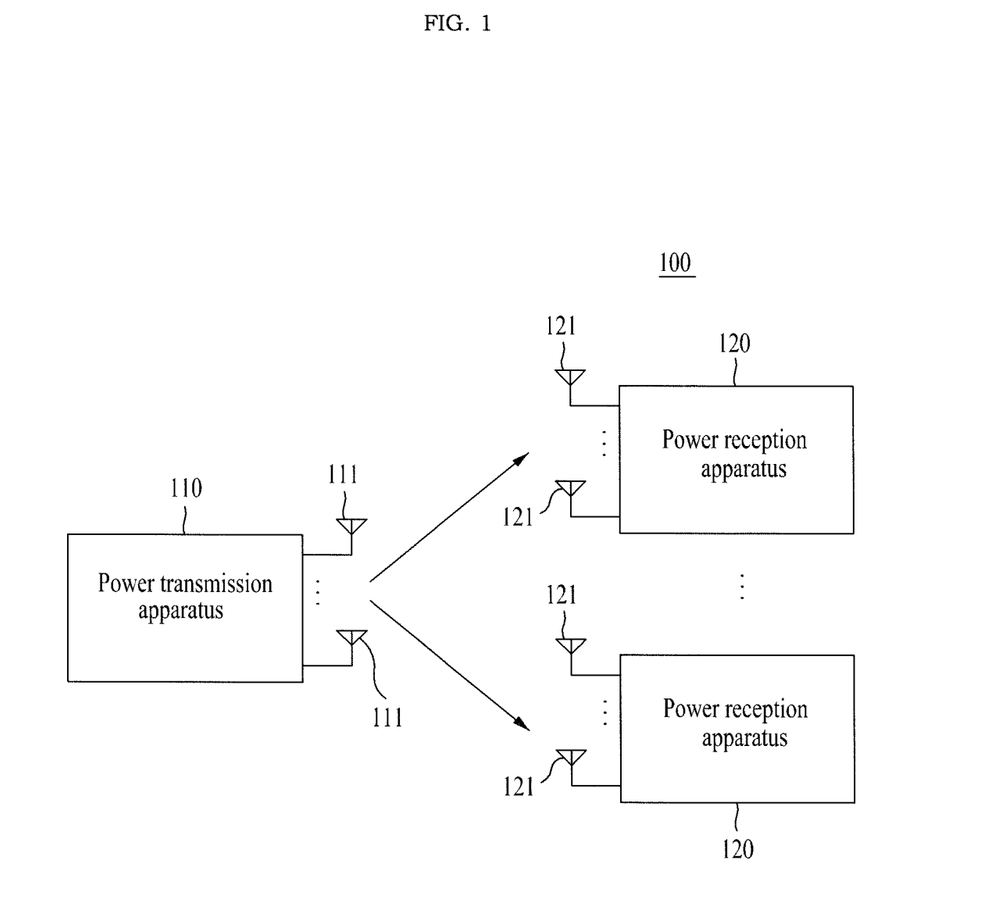
FIG. 1 is a diagram illustrating a wireless powered communication system according to example embodiments.

FIG. 1 is a diagram illustrating a wireless powered communication system according to example embodiments.

Referring to FIG. 1, a wireless powered communication system 100 according to example embodiments may be configured in a multi-antenna broadcasting channel environment and may include at least one power transmission apparatus 110 and at least one of, for example, K power reception apparatuses 120. The power transmission apparatus 110 may include a plurality of, for example, N transmission antennas 111, and the power reception apparatus 120 may include a plurality of, for example, M reception antennas 121.

The power transmission apparatus 110 may transmit a wireless power through a plurality of multiple input multiple output (MIMO) channels formed between the transmission antennas 111 and the reception antennas 121. The power transmission apparatus 110 may configure the wireless power as a transmission signal and may output the transmission signal to the power reception apparatus 120. The power transmission apparatus 110 may transmit the wireless power to the power reception apparatus 120 through energy beams formed based on a plurality of, for example, R beamforming vectors. Here, a number, R, of the beamform vectors may be a design variable. A transmission signal x of the power transmission apparatus 110 may be represented by the following Equation 1. In addition, in the power transmission apparatus 110, a transmission covariance matrix S may be represented by the following Equation 2. Since the transmission covariance matrix S is a positive semi-definite (PSD) matrix, the following Equation 3 and Equation 4 may be met.

$$x = \sum_{r=1}^{R} v_r d_r \quad \text{[Equation 1]}$$

In Equation 1, $v_r$ denotes an $r \in \{1, \ldots, R\}$-th beamforming vector ($v_r \in \mathbb{C}^{N \times 1}$), and $d_r$ denotes a signal modulated from energy that is transmitted from the power transmission apparatus 110 using each beamforming vector. Here, $d_r$ does not include information and thus, may be given as an independent sequence having a distribution with the average of 0 and variance of 1 ($E[|d_r|^2]=1$). Also, E denotes an expectation function.

$$S = E[xx^H] = \sum_{r=1}^{R} v_r v_r^H > 0 \quad \text{[Equation 2]}$$

$$R = \text{rank}(s) \quad \text{[Equation 3]}$$

$$E[\|x\|^2] tr(s) \leq P \quad \text{[Equation 4]}$$

In Equation 4, P denotes the power transmission assigned to the power transmission apparatus 110 and tr denotes a trace function.

The power reception apparatus 120 may receive the wireless power through the plurality of MIMO channels formed between the transmission antennas 111 and the reception antennas 121. Here, the power reception apparatus 120 may receive a signal through energy beams formed based on a plurality of, for example, R beamforming vectors. The power reception apparatus 120 may charge the wireless power based on the received signal. A received signal $y_k$ of a k($k \in \{1, \ldots, K\}$)-th power reception apparatus 120 may be represented by the following Equation 5. Here, the k-th power reception apparatus 120 may receive the wireless power from the power transmission apparatus 110 through energy beamforming during a charging time k. Here, an amount of energy charged from noise is very small compared to an amount of energy charged from the received signal and thus, may be ignored. Therefore, an amount of energy $E_k$ chargeable by a k-th user may be represented by the following Equation 6.

$$y_k = H_k x + n_k \qquad \text{[Equation 5]}$$

In Equation 5, $H_k$ denotes a MIMO channel formed between the power transmission apparatus 110 and the k($k \in \{1, \ldots, K\}$)-th power reception apparatus 120 ($H_k \in \mathbb{C}^{M \times N}$), and $n_k \sim \mathbb{C}\mathcal{N}(0,I)$ denotes additive Gaussian noise. During transmission of the wireless power from the power transmission apparatus 110, the MIMO channel $H_k$ with the power reception apparatus 120 needs to be maintained. Therefore, MIMO channels may be assumed to be static channels and it may be assumed that the power transmission apparatus 110 verifies all of the MIMO channels.

$$E_k = \eta_k t_k E[\|y_k\|^2] = \eta_k t_k E[\|H_k x\|^2] = \eta_k t_k tr(G_k S) \qquad \text{[Equation 6]}$$

In Equation 6, $G_k$ denotes a variable associated with the MIMO channel $H_k$ and may be defined as the following Equation 7. Also, $\eta_k$ denotes an energy storage efficiency of the k-th power reception apparatus 120 ($0 \le \eta_k \le 1$) and may be a constant assigned based on a characteristic of the power reception apparatus 120. Here, $\eta_1 = \ldots = \eta_K = 1$.

$$G_k = (H_k)^* H_k \in \mathbb{C}^{N \times N} \qquad \text{[Equation 7]}$$

In Equation 7, * denotes a conjugate transpose.

Figure 2:
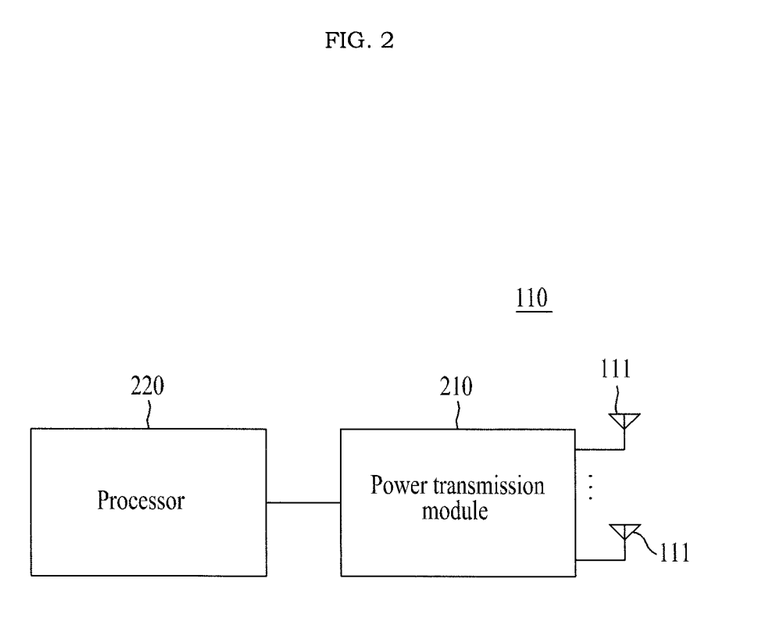
FIG. 2 is a diagram illustrating a power transmission apparatus according to example embodiments.
Figure 3:
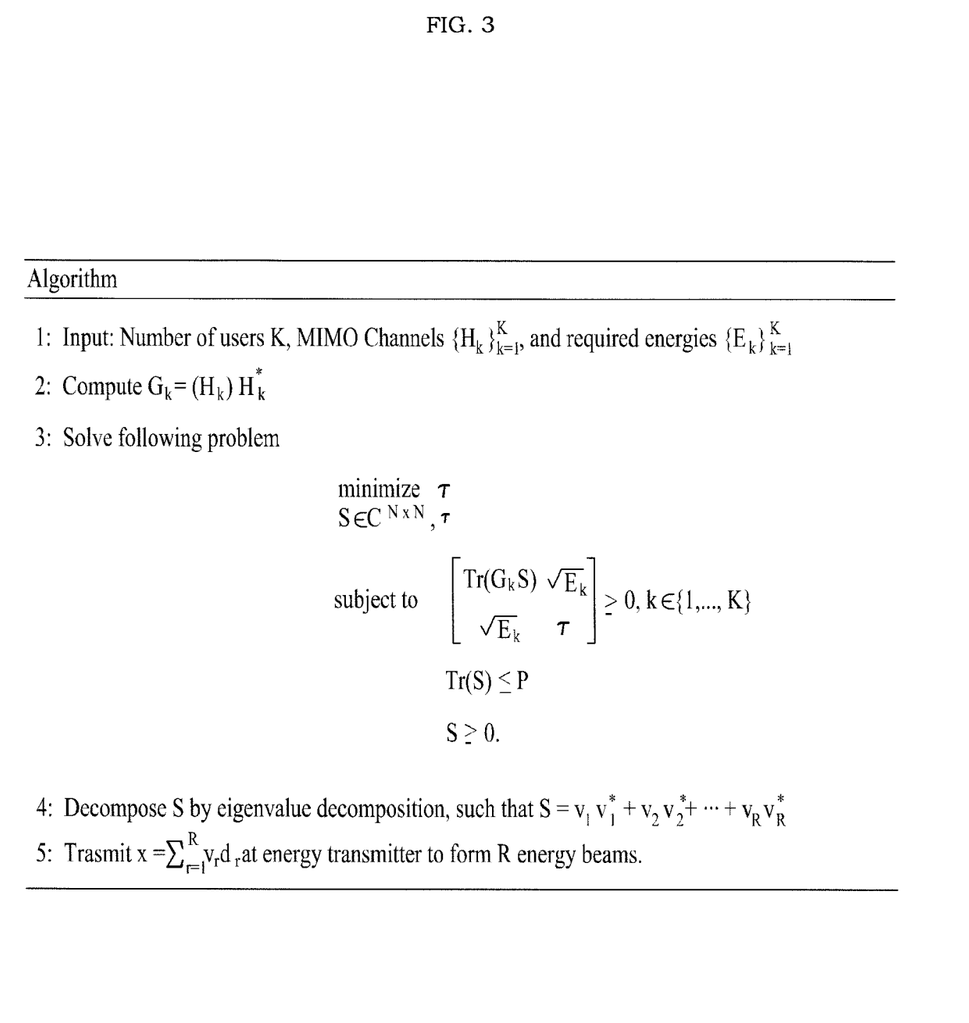
FIG. 3 illustrates an example of a multi-antenna transmission algorithm of a power transmission apparatus according to example embodiments.

FIG. 2 is a diagram illustrating a power transmission apparatus according to example embodiments, and FIG. 3 illustrates an example of a multi-antenna transmission algorithm of a power transmission apparatus according to example embodiments.

Referring to FIG. 2, the power transmission apparatus 110 according to example embodiments may include the plurality of transmission antennas 111, a power transmission module 210, and a processor 220. The power transmission module 210 may output a wireless power via the transmission antennas 111. The power transmission module 210 may configure the wireless power as a transmission signal and may output the transmission signal via the transmission antennas 111. The processor 220 may generate a transmission covariance matrix S capable of minimizing a charging time $t_k$ required by the power reception apparatus 120 based on the amount of energy $E_k$ required by the power reception apparatus 120. Accordingly, the processor 220 may derive a beamforming vector based on the transmission covariance matrix S and may transmit the wireless power to the power reception apparatus 120 based on the beamforming vector through the power transmission module 210.

The charging time $t_k$ required by each power reception apparatus 120 may be represented by the following Equation 8. Here, although an amount of energy $E_k$ required by each power reception apparatus 120 differs, the power transmission apparatus 110 needs to transmit the wireless power to correspond to a total amount of energy required by all of the power reception apparatuses 120. To this end, an energy beamforming optimization problem may be proposed as the following Equation 9. According to the following Equation 9, the energy beamforming optimization problem may be proposed such that the power transmission apparatus 110 may meet a total amount of energy required by all of the power reception apparatuses 120 and may minimize a total charging time of all of the power reception apparatuses 120.

$$t_k = \frac{E_k}{tr(G_k S)} \qquad \text{[Equation 8]}$$

$$\underset{S \in C^{N \times N}}{\text{minimize}} \max(t_1, \ldots, t_K) \qquad \text{[Equation 9]}$$

$$\text{subject to } t_k = \frac{E_k}{tr(G_k S)}, k \in \{1, \ldots, K\}$$

$$tr(S) \le P$$

$$S \succcurlyeq 0$$

In Equation 9, a target function, $\max(t_1, \ldots, t_K)$ denotes a maximum value of the charging time $t_k$ required by each power reception apparatus 120. Also, $tr(S) \le P$ is provided to meet the transmission power assigned to the power transmission apparatus 110 and $S \succcurlyeq 0$ since the transmission covariance matrix S is a positive semi-definite (PSD) matrix.

If an additional variable $\tau$ is defined to derive a solution of the energy beamforming optimization problem of Equation 9, Equation 9 may be represented as a problem equivalent to the following Equation 10. To this end, a Schur complement characteristic of the PSD matrix as represented by the following Equation 11 may be used. In addition, the following Equation 10 may be represented as a problem equivalent to the following Equation 12. To this end, the Schur complement characteristic of the PSD matrix as represented by the following Equation 11 may be used. Here, the following Equation 12 may be a semidefinite programming (SDP) problem.

$$\underset{S \in C^{N \times N}, \tau}{\text{minimize}} \tau \qquad \text{[Equation 10]}$$

$$\text{subject to } \tau \ge \frac{E_k}{tr(G_k S)}, k \in \{1, \ldots, K\}$$

$$tr(S) \le P$$

$$S \succcurlyeq 0$$

In Equation 10, $\tau$ denotes a variable associated with the charging time $t_k$ required by the power reception apparatus 120 and may be defined as $\tau \triangleq \max(t_1, \ldots, t_K)$.

$$a > 0, c - \frac{b^2}{a} \ge 0 \Leftrightarrow a > 0, \begin{bmatrix} a & b \\ b & c \end{bmatrix} \succcurlyeq 0 \qquad \text{[Equation 11]}$$

In Equation 11, $\Leftrightarrow$ denotes equivalence.

$$\underset{S \in C^{N \times N}, \tau}{\text{minimize}} \tau \qquad \text{[Equation 12]}$$

$$\text{subject to } \begin{bmatrix} tr(G_k S) & \sqrt{E_k} \\ \sqrt{E_k} & \tau \end{bmatrix} \succcurlyeq 0, k \in \{1, \ldots, K\}$$

$$tr(S) \le P$$

$$S \succcurlyeq 0$$

Accordingly, an optimization solution of the energy beamforming optimization problem may be derived according to Equation 12. Here, according to an SDP solver program, such as CVX, the optimization solution may be derived as a numerical value. The CVX may easily derive optimization solutions of a convex optimization problem and the SDP problem and may be widely used as a convex optimization method.

According to example embodiments, the processor 220 may operate based on an algorithm of FIG. 3. The processor 220 may determine a number K of the power reception apparatuses 120, a MIMO channel $H_k$ for each power reception apparatus 120, and an amount of energy $E_k$ required by each power reception apparatus 120, and may also determine a variable $G_k$ associated with the MIMO channel $H_k$. The processor 220 may generate the transmission covariance matrix S based on the MIMO channel $H_k$ and the amount of energy $E_k$. The processor 220 may derive the transmission covariance matrix S as a solution of the energy beamforming optimization problem as represented by Equation 12. For example, according to the SDP solver problem, such as the CVX, the processor 220 may derive a solution of the energy beamforming optimization problem as represented by Equation 12. Through this, the processor 220 may derive a beamforming vector using the transmission covariance matrix S. The processor 220 may derive the beamforming vector through an eigenvalue decomposition of the transmission covariance matrix S. Also, the processor 220 may transmit the wireless power to the power reception apparatus 120 based on the beamforming vector. The processor 220 may configure a transmission signal through the power transmission module 210 and may output the transmission signal to the power reception apparatus 120.

Figure 4:
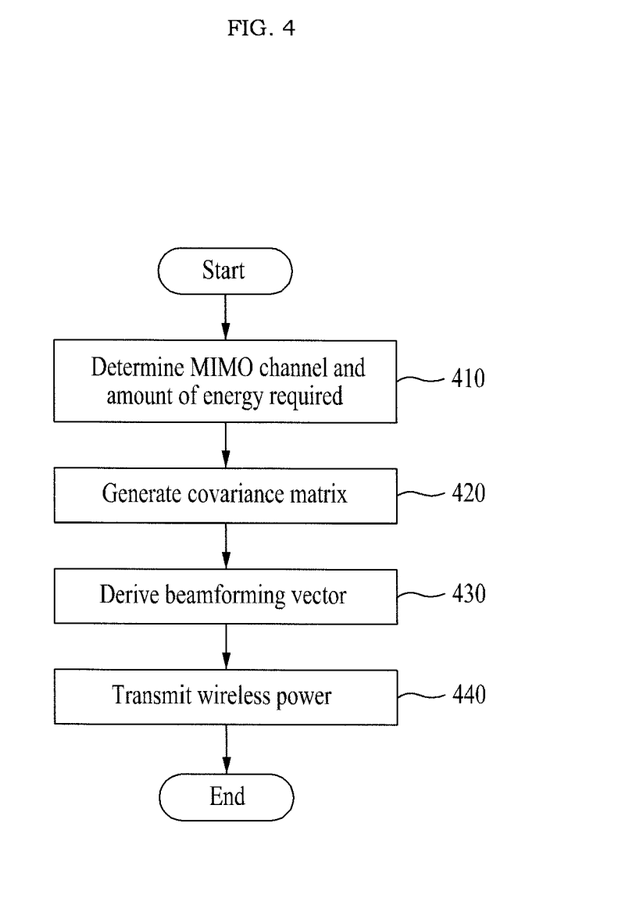
FIG. 4 is a flowchart illustrating a multi-antenna transmission method of a power transmission apparatus according to example embodiments.
Figure 5:
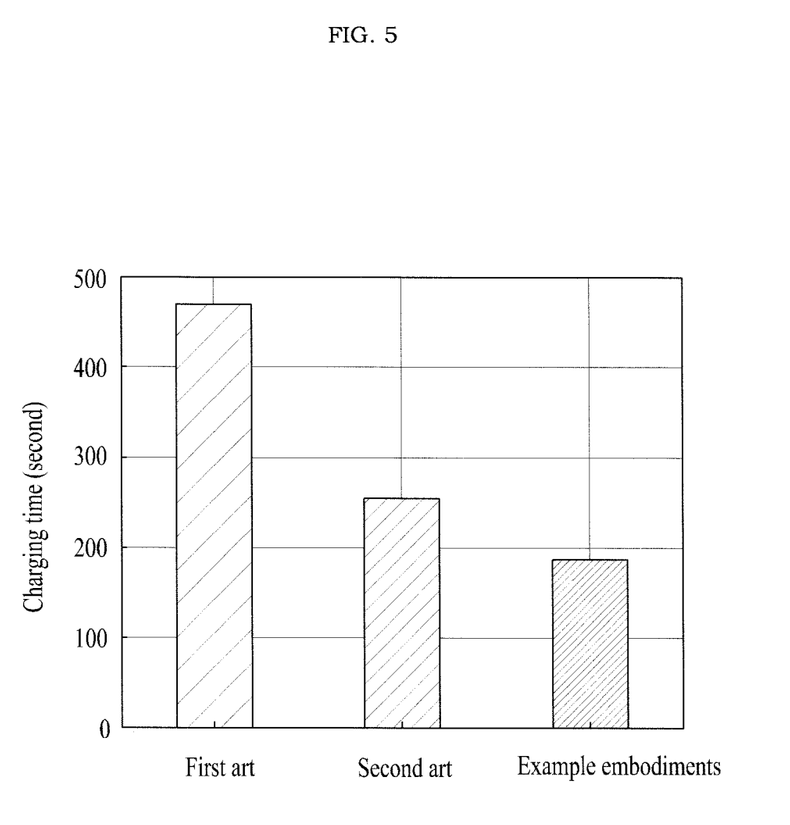
FIGS. 5 and 6 are graphs showing performance of a power transmission apparatus according to example embodiments.
Figure 6:
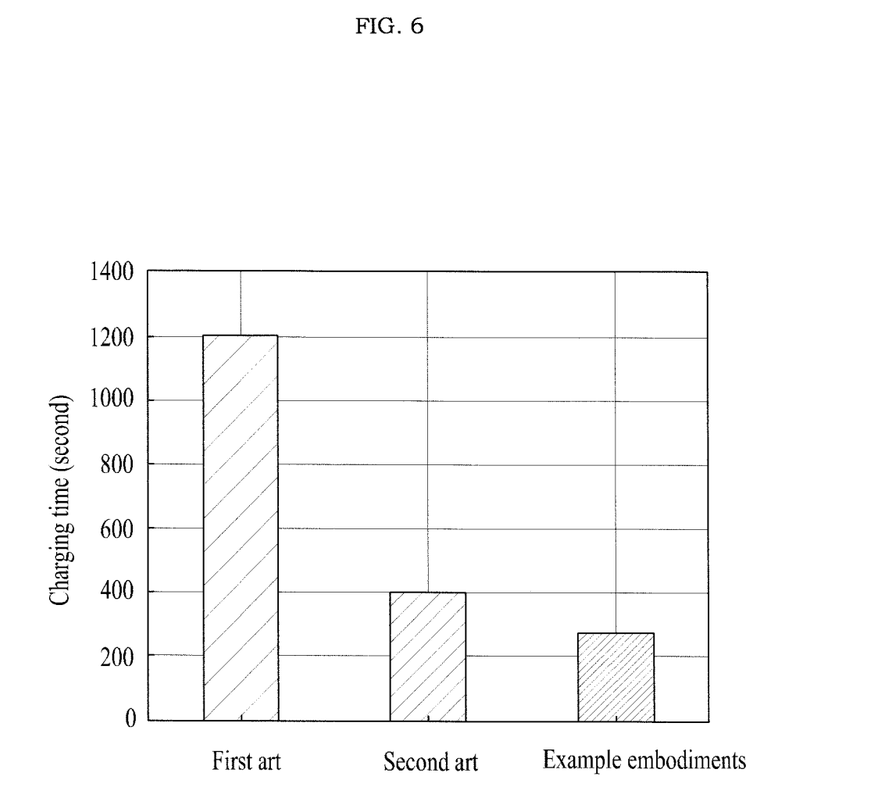

FIG. 4 is a flowchart illustrating a multi-antenna transmission method of a power transmission apparatus according to example embodiments, and FIGS. 5 and 6 are graphs showing performance of a power transmission apparatus according to example embodiments.

Referring to FIG. 4, in operation 410, the power transmission apparatus 110 may determine a number of, for example, K power reception apparatuses 120, a MIMO channel $H_k$ for each power reception apparatus 120, and an amount of energy $E_k$ required by each power reception apparatus 120. Here, the amount of energy $E_k$ required may be determined based on at least one of the MIMO channel $H_k$ for each power reception apparatus 120, a charging time $t_k$ required by each power reception apparatus 120, and an energy storage efficiency $\eta_k$ of each power reception apparatus 120. For example, the amount of energy $E_k$ required may be represented by the following Equation 13. The power transmission apparatus 110 may determine a variable $G_k$ associated with the MIMO channel $H_k$. For example, the variable $G_k$ associated with the MIMO channel $H_k$ may be defined as the following Equation 14.

$$E_k = \eta_k t_k tr(GkS) \quad \text{[Equation 13]}$$

$$G_k = (H_k)^* H_k \quad \text{[Equation 14]}$$

In operation 420, the power transmission apparatus 110 may generate a transmission covariance matrix S to minimize the charging time $t_k$ of the power reception apparatus 120. Here, the power transmission apparatus 110 may generate the transmission covariance matrix S based on the MIMO channel $H_k$ for each power reception apparatus 120 and the amount of energy $E_k$ required by each power reception apparatus 120. For example, according to an SDP solver program such as CVX, the power transmission apparatus 110 may derive the transmission covariance matrix S as a solution of an energy beamforming optimization problem as represented by the following Equation 15.

$$\underset{S \in \mathbb{C}^{N \times N}, \tau}{\text{minimize}} \tau \quad \text{[Equation 15]}$$

-continued $$\text{subject to} \begin{bmatrix} tr(G_k S) & \sqrt{E_k} \\ \sqrt{E_k} & \tau \end{bmatrix} \succcurlyeq 0, k \in \{1, \ldots, K\}$$

$$tr(S) \leq P$$

$$S \succcurlyeq 0$$

In Equation 15, $\tau$ denotes a variable associated with the charging time $t_k$ required by the power reception apparatus 120 and may be defined as $\tau \triangleq \max(t_1, \ldots, t_K)$.

In operation 430, the power transmission apparatus 110 may derive a beamforming vector based on the transmission covariance matrix S. The power transmission apparatus 110 may derive the beamforming vector through an eigenvalue decomposition of the transmission covariance matrix S.

In operation 440, the power transmission apparatus 110 may transmit the wireless power to the power reception apparatus 120 based on the beamforming vector. The power transmission apparatus 110 may configure a transmission signal by modulating the wireless power based on the beamforming vector. The power transmission apparatus 110 may configure the transmission signal as represented by the following Equation 16. The power transmission apparatus 110 may output the transmission signal to the power reception apparatus 120 via the transmission antennas 111.

$$x = \Sigma_{r=1}^R v_r d_r \quad \text{[Equation 16]}$$

In Equation 16, $d_r$ denotes a signal modulated from energy that is transmitted from the power transmission apparatus 110 using each beamforming vector.

According to example embodiments, the power transmission apparatus 110 may perform energy beamforming for transmitting a wireless power such that a charging time of the power reception apparatus 120 may be minimized based on an amount of energy required by the power reception apparatus 120. When the power transmission apparatus 110 transmits the wireless power corresponding to the amount of energy required by the power reception apparatus 120, it is possible to minimize the charging time of the power reception apparatus 120. Referring to FIGS. 5 and 6, a charging time of the power reception apparatus 120 by the power transmission apparatus 110 according to various examples may be significantly short compared to charging times according to various arts. Referring to FIGS. 5 and 6, an amount of time used to completely charge a total amount of energy required by all of the power reception apparatuses 120, that is, a maximum charging time of all of the power reception apparatuses 120 may be represented.

A first art refers to an energy beamforming method that maximizes a weighted sum of reception powers of power reception apparatuses and here, a power transmission apparatus may derive a transmission covariance matrix based on a size of a MIMO channel for each power reception apparatus. A second art relates to an energy beamforming method that maximizes a power of a power reception apparatus of which a reception power is minimum and, here, the power transmission apparatus may derive a transmission covariance matrix based on a MIMO channel for each power reception apparatus. That is, the first art and the second art simply derive the transmission covariance matrix based on the MIMO channel formed between the power transmission apparatus and each power reception apparatus. In contrast, the power transmission apparatus 110 according to example embodiments may derive a transmission covariance matrix based on an amount of energy required by the power reception apparatus 120.

For example, a wireless powered communication network in which a power transmission apparatus includes 16 transmission antennas and each of four power reception apparatuses includes two reception antennas may be assumed. Here, a Rayleigh channel between the power transmission apparatus and the power reception apparatus may be considered, and an average charging time may be represented based on 10000 iterations as illustrated in FIG. 5. According to example embodiments, an amount of energy required by each power reception apparatus 120 may be set to randomly vary at each iteration as represented by the following Equation 17. In the wireless powered communication network, a charging time of the power reception apparatus 120 by the power transmission apparatus 110 according to example embodiments is about 188 seconds, which may be regarded to be significantly short compared to a charging time of about 470 seconds according to the first art and a charging time of about 255 seconds according to the second art.

$$E_k(i)=1000(0.5+2r_k(i))(\text{Joule})$$ [Equation 17]

In Equation 17, $r_k(i)$ may be randomly set based on a uniform probability as a value between 0 and 1 at each iteration.

As another example, a wireless powered communication network in which a power transmission apparatus includes 16 transmission antennas and each of eight power reception apparatuses includes two reception antennas may be assumed. Here, a Rayleigh channel between the power transmission apparatus and the power reception apparatus may be considered, and an average charging time may be represented based on 10000 iterations as illustrated in FIG. 6. According to example embodiments, an amount of energy required by each power reception apparatus 120 may be set to randomly vary at each iteration as represented by Equation 17. In the wireless powered communication network, a charging time of the power reception apparatus 120 by the power transmission apparatus 110 according to example embodiments is about 277 seconds, which may be regarded to be significantly short compared to a charging time of about 1209 seconds according to the first art and a charging time of about 401 seconds according to the second art.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-antenna transmission method of a power transmission apparatus in a wireless powered communication network, the method comprising:
   generating a covariance matrix to minimize a charging time of a power reception apparatus based on an amount of energy required by at least one power reception apparatus;
   deriving a beamforming vector using the covariance matrix; and
   transmitting a wireless power to the power reception apparatus based on the beamforming vector,
   wherein the generating of the covariance matrix comprises:
   determining at least one channel formed between the power transmission apparatus and the power reception apparatus and the amount of energy required; and
   generating the covariance matrix based on the channel and the amount of energy, and
   wherein the generating of the covariance matrix comprises deriving the covariance matrix according to the following equation:

$$\underset{s \in C^{N \times N}, \tau}{\text{minimize}} \tau$$

$$\text{subject to} \begin{bmatrix} tr(G_k S) & \sqrt{E_k} \\ \sqrt{E_k} & \tau \end{bmatrix} \succcurlyeq 0, k \in \{1, \ldots, K\}$$

$$tr(S) \le P$$

$$S \succcurlyeq 0,$$

where S denotes the covariance matrix, $\tau$ denotes a variable associated with the charging time, N being a natural number denotes a number of transmission antennas included in the power transmission apparatus, $G_k$ denotes a variable associated with the channel, $E_k$ denotes the amount of energy required, and P denotes a transmission power assigned to the power transmission apparatus.

2. The method of claim 1, wherein the deriving of the beamforming vector comprises deriving the beamforming vector through an eigenvalue decomposition of the covariance matrix.

3. The method of claim 1, wherein the transmitting of the wireless power comprises:
   configuring a transmission signal by modulating the wireless power based on the beamforming vector; and
   outputting the transmission signal to the power reception apparatus.

4. The method of claim 1, wherein the amount of energy required is determined based on at least one of the charging time, an energy storage efficiency of the power reception apparatus, and the channel.

5. The method of claim 1, wherein the variable associated with the charging time is defined from the charging time according to the following equation:

$$\tau \triangleq \max(t_1, \ldots, t_K)$$

where $t_k$ denotes the charging time.

6. The method of claim 1, wherein the variable associated with the channel is defined from the channel according to the following equation:

$$G_k = (H_k)^* H_k,$$

where $H_k$ denotes the channel.

7. A power transmission apparatus in a wireless powered communication network, the power transmission apparatus comprising:
   a plurality of transmission antennas; and
   a processor configured to connect to the plurality of transmission antennas, and to transmit a wireless power to at least one power reception apparatus via the plurality of transmission antennas,
   wherein the processor is configured to generate a covariance matrix to minimize a charging time of the power reception apparatus based on an amount of energy required by the power reception apparatus, to derive the beamforming vector using the covariance matrix, and to transmit the wireless power to the power reception apparatus based on the beamforming vector, wherein the processor is configured to determine at least one channel formed between the power transmission apparatus and the power reception apparatus and the amount of energy required, and to generate the covariance matrix based on the channel and the amount of energy, and wherein the processor is configured to derive the covariance matrix according to the following equation:

$$\underset{S \in \mathbb{C}^{N \times N}, \tau}{\text{minimize}} \; \tau$$

$$\text{subject to} \begin{bmatrix} tr(G_k S) & \sqrt{E_k} \\ \sqrt{E_k} & \tau \end{bmatrix} \succcurlyeq 0, k \in \{1, \ldots, K\}$$

$$tr(S) \leq P$$

$$S \succcurlyeq 0,$$

where S denotes the covariance matrix, $\tau$ denotes a variable associated with the charging time, N being a natural number denotes a number of transmission antennas included in the power transmission apparatus, $G_k$ denotes a variable associated with the channel, $E_k$ denotes the amount of energy required, and P denotes a transmission power assigned to the power transmission apparatus.

8. The power transmission apparatus of claim 7, wherein the processor is configured to derive the beamforming vector through an eigenvalue decomposition of the covariance matrix.

9. The power transmission apparatus of claim 7, wherein the processor is configured to configure a transmission signal by modulating the wireless power based on the beamforming vector, and to output the transmission signal to the power reception apparatus via the transmission antennas.

10. The power reception apparatus of claim 7, wherein the amount of energy required is determined based on at least one of the charging time, an energy storage efficiency of the power reception apparatus, and the channel.

11. The power transmission apparatus of claim 7, wherein the variable associated with the charging time is defined from the charging time according to the following equation:

$$\tau \triangleq \max(t_1, \ldots, t_K), \text{ and}$$

the variable associated with the channel is defined from the channel according to the following equation:

$$G_k = (H_k)^* H_k,$$

where $t_k$ denotes the charging time and $H_k$ denotes the channel.

* * * * *